April 20, 1926.
R. B. FAGEOL
1,581,433
SEMIRESILIENT BUMPER
Filed June 3, 1925 2 Sheets-Sheet 1
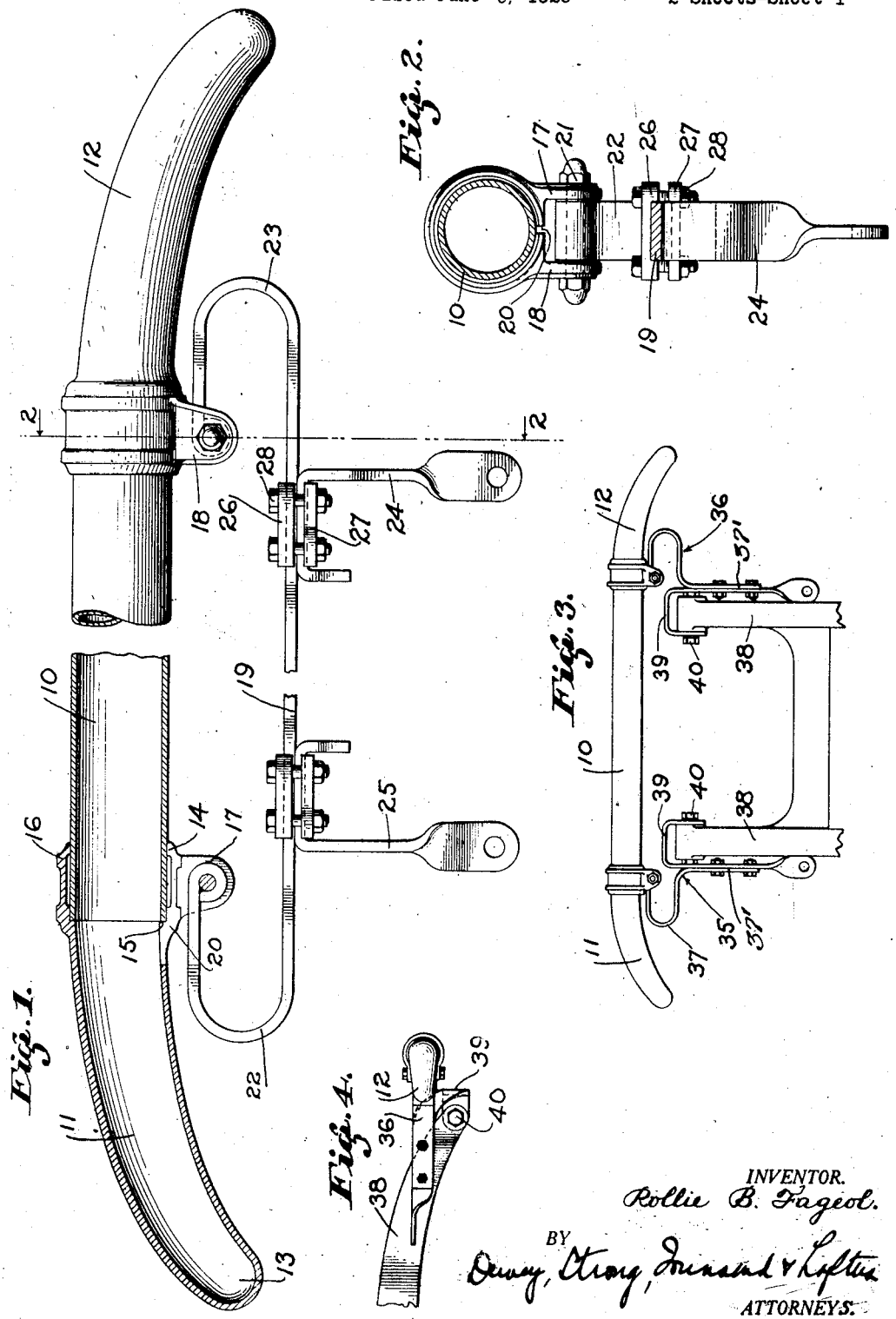
INVENTOR.
Rollie B. Fageol.
BY
Dewey, Strong, Townsend & Lyster
ATTORNEYS.

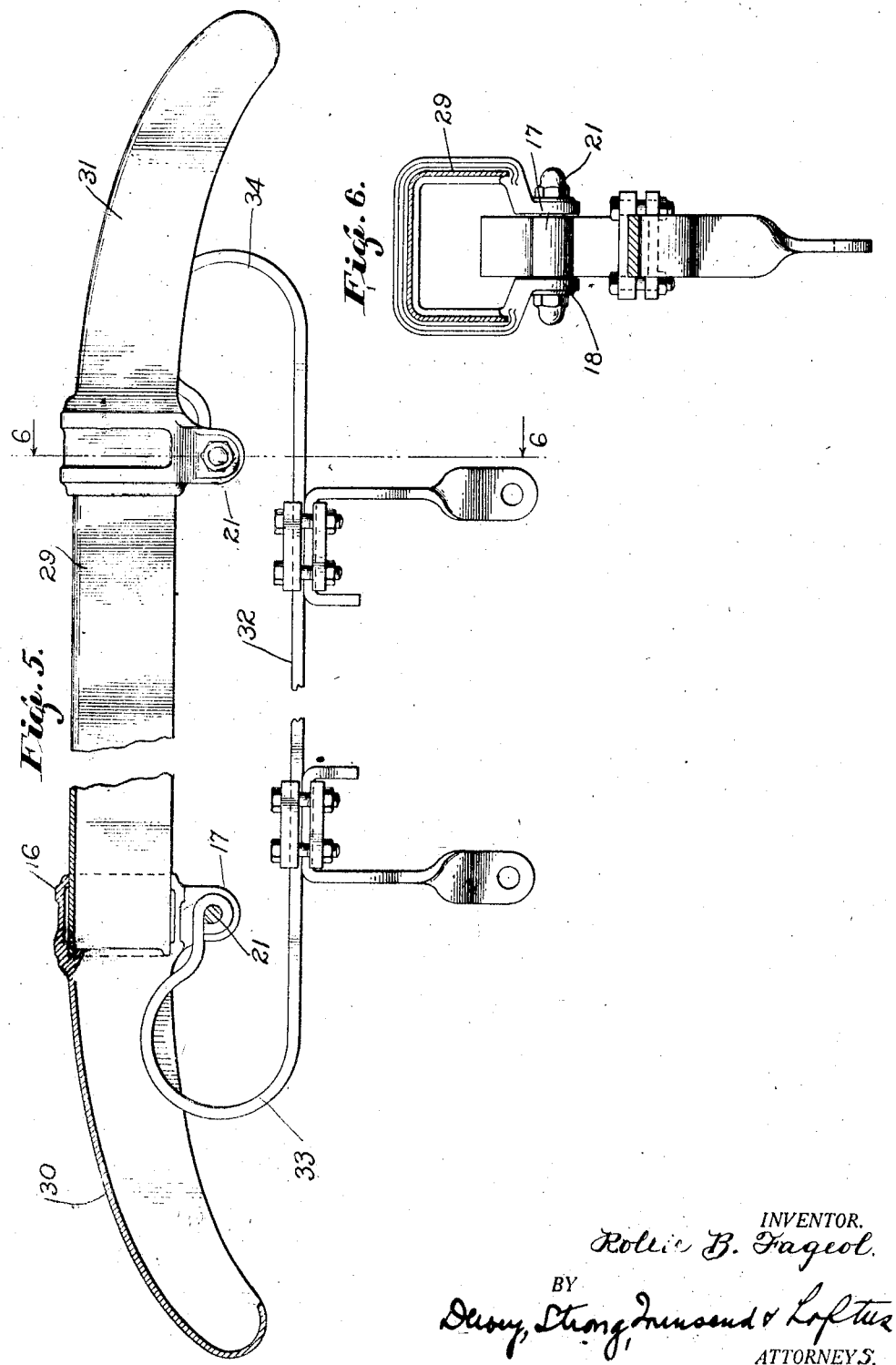

Patented Apr. 20, 1926.

1,581,433

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

SEMIRESILIENT BUMPER.

Application filed June 3, 1925. Serial No. 34,537.

*To all whom it may concern:*

Be it known that I, ROLLIE B. FAGEOL, a citizen of the United States, residing at Los Angeles, county of Los Angeles, and State of California, have invented new and useful Improvements in Semiresilient Bumpers, of which the following is a specification.

This invention relates to an automobile bumper and particularly pertains to a semi-resilient bumper structure.

It is the principal object of the present invention to provide an automobile bumper which has a rigd impact structure resiliently supported in a horizontal position transversely of the front of an automobile, the bumper thus provided acting to ward off objects struck in collision and under excessive impact to absorb the shock of collision in the resilient portion of the bumper without distorting the frame and without otherwise injuring the vehicle.

The invention is illustrated by way of example in the accompanying drawings, in which:

Fig. 1 is a view in plan showing parts of the bumper in section and elevation and with the central portion of the bumper broken away for the sake of convenience.

Fig. 2 is a view in section and elevation through the bumper as disclosed on lines 2—2 of Fig. 1.

Fig. 3 is a plan view of a modified form of the invention embodying the use of a resilient bumper bracket.

Fig. 4 is a view in end elevation of the form of bumper shown in Fig. 3.

Fig. 5 is a modified form of the invention as shown in Fig. 1 with parts broken away for the sake of clearness.

Fig. 6 is a view in section and elevation through the form of bumper shown in Fig. 5 as seen on the line 6—6 of that figure.

Referring more particularly to Figs. 1 and 2 of the drawings, 10 indicates a central rigid impact member disposed transversely of the front of a vehicle and of a length substantially equal to the distance across the frame of the vehicle.

Mounted upon the opposite ends of the tubular central impact member 10 of the form of the invention shown in Fig. 1, are impact horns 11 and 12. These horns are preferably cast and are tubular in formation. The horn 11 is shown in section in Fig. 1, and it will there be seen that the horn curves rearwardly and that its side walls taper towards a blunt closed point 13. The opened end of the horn forms an annular counterbore 14 to receive the cylindrical end of the central impact member 10. This counterbore terminates in a square shoulder 15 against which the end of the tube 10 seats. The counterbored portion of each horn is surrounded by a wall 16 which may be of any desired outer configuration, but is fitted with a pair of lugs 17 and 18 between which a resilient back bar 19 may be mounted.

Referring more particularly to Fig. 2 of the drawings, it will be seen that the portion 16 of each horn is split for a length between the lugs 17 and 18, as indicated at 20. This makes it possible to draw the lugs toward each other by the action of a clamping bolt 21 and to thereby clamp the horn onto the outer end of the tubular impact member 10 while at the same time clamping the ends of the resilient back bar 19 between the lugs.

The ends of the resilient back bar as shown in Fig. 1, terminate in eyes through which the bolts 21 pass, the vertical width of the back bar being equal to the distance between the opposing faces of the lugs 17 and 18. This back bar may be of any desired configuration, but is here shown as being formed with loops 22 and 23 which extend outwardly in the rear of the horns 11 and 12 and are connected integrally with a spanning length of the back bar which is preferably straight. This spanning length of back bar is parallel to the longitudinal axis of the impact bar 10 and lies in substantially the same horizontal plane therewith while in the rear thereof and while interposed between the impact bar 10 and the ends of the frame horns on which the structure is supported.

Mounting brackets 24 and 25 are adjustably secured to the parallel portion of the back bar by clamp plates 26 and 27 and bolts 28. It is to be understood that the mounting arms 24 and 25 may be of any desired configuration as necessitated by the dimensions and design of the automobile onto which the bumper is to be mounted, and that due to the provision of the adjustable clamping plates 26 and 27, it is possible to move the brackets laterally to accommodate automobiles, the frame members of which are varyingly spaced with relation to each other.

In the form of the invention shown in Figs. 5 and 6, central impact member 29 corresponding to the tubular impact member 10 of the structure shown in Fig. 1 is of channel section and horns 30 and 31 mounted on opposite ends thereof are of channel section while carrying out substantially the same configuration as the horns 11 and 12 of Fig. 1. The horns 30 and 31 are formed with angular portions 16 and the lugs 17 and 18 previously described, by which the horns may be rigidly clamped onto the ends of the impact section 29 by the bolts 21.

The back bar 32 as shown in Fig. 5, is formed with circular end loops 33 and 34 which curve forwardly of their eyes, so that the forward portions of the loops will project into the channel space formed in the rear of the horns 30 and 31.

In the form of the invention shown in Figs. 3 and 4 of the drawing, the impact structure comprises the rigid center section 10 and horns 11 and 12, to which horns are attached side brackets 35 and 36. These brackets are each formed with outwardly flaring loops 37 corresponding to the loop portions 22 and 23 and 33 and 34 of the forms of bumpers shown in Figs. 1 and 5, and by which loops resilient support for the bumpers is afforded. The brackets 35 and 36 have rearwardly extending arms 37' projecting along the outer sides of the frame members 38 and suitably connected thereto. Forming a part of said bracket structure are auxiliary loops 39 which extend forwardly and across the separate ends of the frame horns to be secured upon the front spring bolts 40.

It will thus be apparent that a resilient loop 39 will be interposed between the end of a frame horn 38 and the rear face of a central impact bar 10 or 29, as shown in Figs. 1 and 5 respectively. Thus, under extreme deflection of the bracket loops 37, the impact bar will strike against the auxiliary loops 39 and will be cushioned to prevent distortion and undue injury to the frame of the vehicle.

It will thus be seen that in the forms of the invention here disclosed, a rigid impact bar of substantial strength will be supported transversely of the end of a vehicle and will carry rigid horns curving rearwardly by which objects may be warded off from contact with the vehicle frame or its fenders, said rigid impact structure being resiliently supported by unconnected looped bumper brackets or a continuous resilient rear bar formed with loops at its ends, the horns of the impact section and the resilient mountings therefor being rigidly clamped relative to each other and the central impact members 10 or 29.

While I have shown the preferred forms of my invention as now known to me, it is to be understood that various changes may be made in its construction without departing from the spirit of the invention as defined in the appended claims.

Having thus described my invention, what I claim and desire to secure by Letters Patent is:

1. An automobile bumper comprising a central horizontal impact section substantially agreeing in length with the width of an automobile frame upon which it is mounted, impact horns disposed at the opposite ends of said central impact member and resilient means adapted to be mounted upon the automobile frame and to engage the bumper structure at points intermediate its ends for the support of the same.

2. An automobile bumper comprising a resilient mounting structure disposed horizontally of an automobile frame and terminating in forwardly bent resilient loops a rigid impact member carried by the looped portions and rigid horns mounted at opposite ends of said impact member and overhanging the loops.

3. A bumper construction comprising a resilient rear bumper bar mounted to extend horizontally and transversely of the end of an automobile frame, impact bumper horns disposed in front of said bumper bar and extending outwardly at opposite sides of the frame, a central impact member supported by and between the inner ends of said horns, and means for rigidly clamping the horns with relation to the said impact member and the back bar.

4. A bumper construction comprising looped resilient supporting means carried by the frame of a vehicle, bumper horns mounted on the forward ends of said looped supporting members and extending outwardly from opposite sides of the frame in a horizontal plane, a central transversely disposed impact member supported by and between the inner ends of said horns, and means for simultaneously clamping said member to said horns and clamping the horns to the resilient supporting means.

ROLLIE B. FAGEOL.